(12) United States Patent
Ji et al.

(10) Patent No.: US 11,108,761 B2
(45) Date of Patent: Aug. 31, 2021

(54) METHOD, APPARATUS AND SYSTEM FOR REMOTE CONTROL OF INTELLIGENT DEVICE

(71) Applicant: BEIJING BAIDU NETCOM SCIENCE AND TECHNOLOGY CO., LTD., Beijing (CN)

(72) Inventors: Yousheng Ji, Beijing (CN); Dachun Liao, Beijing (CN); Zhehao Li, Beijing (CN); Guangfu Zhou, Beijing (CN); Xiaoqian Liu, Beijing (CN); Guang Ling, Beijing (CN); Chao Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 410 days.

(21) Appl. No.: 16/054,946

(22) Filed: Aug. 3, 2018

(65) Prior Publication Data
US 2019/0068576 A1    Feb. 28, 2019

(30) Foreign Application Priority Data
Aug. 25, 2017   (CN) .......................... 201710742879.0

(51) Int. Cl.
*G06F 7/04* (2006.01)
*G06F 15/16* (2006.01)
(Continued)

(52) U.S. Cl.
CPC ........ *H04L 63/0807* (2013.01); *H04L 51/046* (2013.01); *H04L 51/066* (2013.01);
(Continued)

(58) Field of Classification Search
USPC ........................................................... 726/7
See application file for complete search history.

(56) References Cited

U.S. PATENT DOCUMENTS

| 10,382,203 B1* | 8/2019 | Loladia ..................... H04L 9/30 |
| 2011/0209196 A1* | 8/2011 | Kennedy ................. G06F 21/60 726/1 |

(Continued)

FOREIGN PATENT DOCUMENTS

CN           104980332 A       10/2015

*Primary Examiner* — Jeffrey C Pwu
*Assistant Examiner* — Samuel Ambaye
(74) *Attorney, Agent, or Firm* — Lathrop GPM LLP

(57) ABSTRACT

A method, apparatus and system for remote control of intelligent device are disclosed. The method comprises: sending account information to a third-party server in response to receiving the account information input by a user; sending a third-party server identifier and a third-party token to a universal identifier server in response to receiving the third-party token sent by the third-party server; receiving a control terminal universal identifier, a control terminal instant messaging token and a controlled device universal identifier list sent by the universal identifier server, and presenting the controlled device universal identifier list; receiving a control instruction input by the user in response to receiving a controlled device selection operation of the user on a controlled device universal identifier in the presented controlled device universal identifier list; and sending a target controlled device universal identifier, the control instruction and the control terminal instant messaging token to an instant messaging server.

22 Claims, 6 Drawing Sheets

(51) Int. Cl.
*H04L 29/06* (2006.01)
*H04L 12/58* (2006.01)
*H04L 29/08* (2006.01)

(52) U.S. Cl.
CPC ............ *H04L 51/18* (2013.01); *H04L 63/062* (2013.01); *H04L 63/065* (2013.01); *H04L 63/0876* (2013.01); *H04L 67/025* (2013.01); *H04L 67/20* (2013.01)

(56) References Cited

U.S. PATENT DOCUMENTS

| | | | | |
|---|---|---|---|---|
| 2011/0231921 | A1* | 9/2011 | Narayanan | G06F 21/604 |
| | | | | 726/9 |
| 2011/0265166 | A1* | 10/2011 | Franco | G06F 21/34 |
| | | | | 726/7 |
| 2011/0283347 | A1* | 11/2011 | Bhuta | H04L 63/0807 |
| | | | | 726/9 |
| 2018/0205742 | A1* | 7/2018 | Vinukonda | H04L 67/02 |

\* cited by examiner

METHOD, APPARATUS AND SYSTEM FOR REMOTE CONTROL OF INTELLIGENT DEVICE

CROSS-REFERENCE TO RELATED APPLICATIONS

This application claims priority to Chinese Patent Application No. 201710742879.0, filed with the State Intellectual Property Office of the People's Republic of China (SIPO) on Aug. 25, 2017, the content of which is incorporated herein by reference in its entirety.

TECHNICAL FIELD

The present disclosure relates to the technical field of computers, specifically to the technical field of the Internet of things, and in particular to a method, apparatus and system for remote control of an intelligent device.

BACKGROUND

The remote control of an intelligent device refers to a method for remotely controlling the intelligent device through a control terminal. The existing remote control of intelligent devices mostly uses an instant messaging server to realize instant messaging between a control terminal and a controlled device. To realize the authorization of the instant messaging server to the control terminal and the controlled device, at present, the mostly adopt way is to apply for, for the control terminal and the controlled device, registered account passwords in bulk in an identical account system, and assign an account password to each control terminal and each controlled device. In this way, the control terminal and the controlled device both use an account in an identical account system and use the account as an identifier for communication in the instant messaging server.

However, the existing method for controlling an intelligent device by registering accounts in bulk in advance for a control terminal and a controlled device cannot realize the control of the controlled devices under different account systems through the control terminal.

SUMMARY

The object of embodiments of the present disclosure is to provide an improved method and system for remote control of an intelligent device to solve the technical problems mentioned in the above background section.

In a first aspect, the embodiments of the present disclosure provide a method for remote control of an intelligent device for a control terminal, and the method includes: in response to receiving account information of a target third-party account type input by a user, sending the account information to a third-party server corresponding to the target third-party account type for the third-party server to generate a third-party token corresponding to the account information; sending a third-party server identifier and the third-party token of the third-party server to a universal identifier server in response to receiving the third-party token sent by the third-party server, for the universal identifier server to send the third-party token to the third-party server, receive user information corresponding to the third-party token from the third-party server, determine a control terminal universal identifier corresponding to the third-party server identifier and the user information, send the control terminal universal identifier to an instant messaging server, receive a control terminal instant messaging token generated by the instant messaging server according to the control terminal universal identifier from the instant messaging server, and acquire a controlled device universal identifier list corresponding to the control terminal universal identifier; receiving the control terminal universal identifier, the control terminal instant messaging token and the controlled device universal identifier list, and presenting the controlled device universal identifier list that are sent by the universal identifier server; receiving a control instruction input by the user in response to receiving a controlled device selection operation of the user on a controlled device universal identifier in the presented controlled device universal identifier list; and sending a target controlled device universal identifier targeted by the controlled device selection operation, the control instruction and the control terminal instant messaging token to the instant messaging server, for the instant messaging server to determine whether to forward the control instruction to a target controlled device indicated by the target controlled device universal identifier according to the control terminal instant messaging token.

In a second aspect, the embodiments of the present disclosure provide a method for remote control of an intelligent device for a controlled device, and the method includes: sending a preset device identifier to a universal identifier server in response to detecting a start signal, for the universal identifier server to determine a controlled device universal identifier corresponding to the preset device identifier, generate a universal identifier token according to the controlled device universal identifier, send the controlled device universal identifier to an instant messaging server, and receive, from the instant messaging server, a controlled device instant messaging token generated according to the controlled device universal identifier by the instant messaging server; and receiving the controlled device instant messaging token and the universal identifier token sent by the universal identifier server to communicate with the instant messaging server using the controlled device instant messaging token and communicate with the universal identifier server using the universal identifier token.

In a third aspect, the embodiments of the present disclosure provide a method for remote control of an intelligent device for a universal identifier server, and the method includes: sending a third-party token to a third-party server indicated by a third-party server identifier in response to receiving the third-party server identifier and the third-party token sent by a control terminal, for the third-party server to determine user information corresponding to a received third-party token according to the received third-party token; in response to receiving the user information corresponding to the third-party token sent by the third-party server, determining a control terminal universal identifier corresponding to the third-party server identifier and the user information; sending the control terminal universal identifier to an instant messaging server for the instant messaging server to generate a control terminal instant messaging token according to the control terminal universal identifier; receiving the control terminal instant messaging token sent by the instant messaging server; acquiring a controlled device universal identifier list corresponding to the control terminal universal identifier; sending the control terminal universal identifier, the control terminal instant messaging token and the controlled device universal identifier list to the control terminal; determining a controlled device universal identifier corresponding to the device identifier in response to receiving the device identifier sent by the controlled device; generating a universal identifier token according to the controlled device universal identifier; sending the controlled device universal identifier to an instant messaging server for the instant messaging server to generate a controlled device instant messaging token according to the controlled device universal identifier; and sending the controlled device instant messaging token and the universal identifier token to the controlled device in response to receiving the controlled device instant messaging token sent by the instant messaging server, for the controlled device to communicate with the instant messaging server by using the controlled device instant messaging token, and communicate with the universal identifier server by using the universal identifier token.

In a fourth aspect, the embodiments of the present disclosure provide a method for remote control of an intelligent device for an instant messaging server, and the method includes: in response to receiving a control terminal universal identifier sent by a universal identifier server, generating a control terminal instant messaging token according to the control terminal universal identifier; sending the generated control terminal instant messaging token to the universal identifier server; generating a controlled device instant messaging token according to the controlled device universal identifier in response to receiving the controlled device universal identifier sent by the universal identifier server; sending the generated controlled device instant messaging token to the universal identifier server; and in response to receiving a target controlled device universal identifier, a control instruction and the control terminal instant messaging token sent by the control terminal, determining, according to the received control terminal instant messaging token, whether to forward the control instruction to a target controlled device indicated by the target controlled device universal identifier.

In a fifth aspect, the embodiments of the present disclosure provide an apparatus for remote control of an intelligent device for a control terminal, and the apparatus includes: a first sending unit, for, in response to receiving account information of a target third-party account type input by a user, sending the account information to a third-party server corresponding to the target third-party account type for the third-party server to generate a third-party token corresponding to the account information; a second sending unit, for sending a third-party server identifier and the third-party token of the third-party server to a universal identifier server in response to receiving the third-party token sent by the third-party server, for the universal identifier server to send the third-party token to the third-party server, receive user information corresponding to the third-party token from the third-party server, determine a control terminal universal identifier corresponding to the third-party server identifier and the user information, send the control terminal universal identifier to an instant messaging server, receive a control terminal instant messaging token generated by the instant messaging server according to the control terminal universal identifier from the instant messaging server, and acquire a controlled device universal identifier list corresponding to the control terminal universal identifier; a first receiving unit, for receiving the control terminal universal identifier, the control terminal instant messaging token and the controlled device universal identifier list that are sent by the universal identifier server, and presenting the controlled device universal identifier list; a second receiving unit, for receiving a control instruction input by the user in response to receiving a controlled device selection operation of the user on a controlled device universal identifier in the presented controlled device universal identifier list; and a third sending unit, for sending a target controlled device universal identifier targeted by the controlled device selection operation, the control instruction and the control terminal instant messaging token to the instant messaging server for the instant messaging server to determine whether to forward the control instruction to a target controlled device indicated by the target controlled device universal identifier according to the control terminal instant messaging token.

In a sixth aspect, the embodiments of the present disclosure provide an apparatus for remote control of an intelligent device for a controlled device, and the apparatus includes: a fourth sending unit, for sending a preset device identifier to a universal identifier server in response to detecting a start signal, for the universal identifier server to determine a controlled device universal identifier corresponding to the preset device identifier, generate a universal identifier token according to the controlled device universal identifier, send the controlled device universal identifier to an instant messaging server, and receive, from the instant messaging server, a controlled device instant messaging token generated according to the controlled device universal identifier by the instant messaging server; and a third receiving unit, for receiving the controlled device instant messaging token and the universal identifier token sent by the universal identifier server to communicate with the instant messaging server using the controlled device instant messaging token and communicate with the universal identifier server using the universal identifier token.

In a seventh aspect, the embodiments of the present disclosure provide an apparatus for remote control of an intelligent device for a universal identifier server, and the apparatus includes: a fifth sending unit, for sending a third-party token to a third-party server indicated by a third-party server identifier in response to receiving the third-party server identifier and the third-party token sent by a control terminal, for the third-party server to determine user information corresponding to the received third-party token according to the received third-party token; a second determining unit, for, in response to receiving the user information corresponding to the third-party token sent by the third-party server, determining a control terminal universal identifier corresponding to the third-party server identifier and the user information; a sixth sending unit, for sending the control terminal universal identifier to an instant messaging server for the instant messaging server to generate a control terminal instant messaging token according to the control terminal universal identifier; a fourth receiving unit, for receiving the control terminal instant messaging token sent by the instant messaging server; a first acquiring unit, for acquiring a controlled device universal identifier list corresponding to the control terminal universal identifier; a seventh sending unit, for sending the control terminal universal identifier, the control terminal instant messaging token and the controlled device universal identifier list to the control terminal; a third determining unit, for determining a controlled device universal identifier corresponding to the device identifier in response to receiving the device identifier sent by the controlled device; a first generating unit, for generating a universal identifier token according to the controlled device universal identifier; an eighth sending unit, for sending the controlled device universal identifier to an instant messaging server, for the instant messaging server to generate a controlled device instant messaging token according to the controlled device universal identifier; and a ninth sending unit, for sending the controlled device instant messaging token and the universal identifier token to the controlled device in response to receiving the controlled device instant messaging token sent by the instant messaging server, for the controlled device to communicate with the instant messaging server by using the controlled device instant messaging token, and communicate with the universal identifier server by using the universal identifier token.

In an eighth aspect, the embodiments of the present disclosure provide an apparatus for remote control of an intelligent device for an instant messaging server, and the apparatus includes: a second generating unit, for, in response to receiving a control terminal universal identifier sent by a universal identifier server, generating a control terminal instant messaging token according to the control terminal universal identifier; a tenth sending unit, for sending the generated control terminal instant messaging token to the universal identifier server; a third generating unit, for generating a controlled device instant messaging token according to the controlled device universal identifier in response to receiving the controlled device universal identifier sent by the universal identifier server; an eleventh sending unit, for sending the generated controlled device instant messaging token to the universal identifier server; and a fourth determining unit, for, in response to receiving a target controlled device universal identifier, a control instruction and the control terminal instant messaging token sent by the control terminal, determining, according to the received control terminal instant messaging token, whether to forward the control instruction to a target controlled device indicated by the target controlled device universal identifier.

In a ninth aspect, the embodiments of the present application provide a control terminal comprising: one or more processors, and a storage device for storing one or more programs, wherein when the one or more programs are executed by the one or more processors, the one or more processors implement the method as described in any implementation in the first aspect.

In a tenth aspect, the embodiments of the present disclosure provide a controlled device comprising: one or more processors, and a storage device for storing one or more programs, wherein when the one or more programs are executed by the one or more processors, the one or more processors implement the method as described by any implementation in the second aspect.

In an eleventh aspect, the embodiments of the present application provide a universal identifier server comprising: one or more processors, and a storage device for storing one or more programs, wherein when the one or more programs are executed by the one or more processors, the one or more processors implement the method as described by any implementation in the third aspect.

In a twelfth aspect, the embodiments of the present application provide an instant messaging server comprising: one or more processors, and a storage device for storing one or more programs, wherein when the one or more programs are executed by the one or more processors, the one or more processors implement the method as described by any implementation in the fourth aspect.

In a thirteenth aspect, the embodiments of the present application provide a computer readable storage medium on which computer programs are stored, and the computer readable storage medium is characterized in that when the programs are executed by the processors, the method as described by any implementation in the first aspect is implemented.

In a fourteenth aspect, the embodiments of the present application provide a computer readable storage medium on which computer programs are stored, and the computer readable storage medium is characterized in that when the programs are executed by the processors, the method as described by any implementation in the second aspect is implemented.

In a fifteenth aspect, the embodiments of the present application provide a computer readable storage medium on which computer programs are stored, and the computer readable storage medium is characterized in that when the programs are executed by the processors, the method as described by any implementation in the third aspect is implemented.

In a sixteenth aspect, the embodiments of the present application provide a computer readable storage medium on which computer programs are stored, and the computer readable storage medium is characterized in that when the programs are executed by the processors, the method as described by any implementation in the fourth aspect is implemented.

In a seventeenth aspect, the embodiments of the present disclosure provide a system for remote control of an intelligent device, and the system includes the control terminal as described in the ninth aspect, the controlled device as described in the tenth aspect, the universal identifier server as described in the eleventh aspect, the instant messaging server as described in the twelfth aspect, and a third-party server that provides support for a third-party account type.

The method, apparatus and system for remote control of an intelligent device, provided by the embodiments of the present disclosure, by adding a universal identifier server, realize that, in a control terminal a user logs in using a third-party account, in the universal identifier server the third-party account is mapped to a unified universal identifier, and in the universal identifier server a hardware identifier of the controlled device is also mapped to the unified universal identifier; the control terminal and the controlled device realize communication through the instant messaging server both through the unified universal identifier after mapping, thus eliminating the need of registering accounts in bulk for the control terminal and the controlled device in advance, simplifying the control flow, and realizing that the control terminal can control the controlled device by using an existing third-party account.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
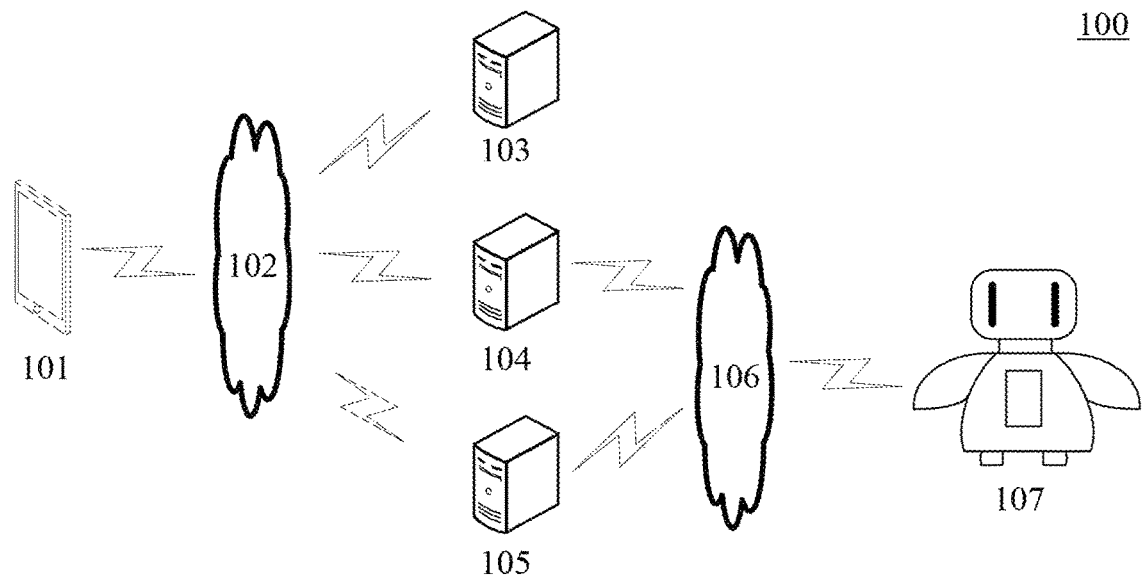
FIG. 1 is an architectural diagram of an exemplary system in which the present disclosure may be implemented.

FIG. 1 shows an exemplary architecture of a system 100 which may be used by a method for remote control of an intelligent device or an apparatus for remote control of an intelligent device according to the embodiments of the present disclosure.

As shown in FIG. 1, the system architecture 100 may include a control terminal 101, a network 102, a third-party server 103, a universal identifier server 104, an instant messaging (IM) server 105, a network 106, and a controlled device 107. The network 102 servers as a medium providing communication links among the control terminal 101, the third-party server 103, the universal identifier server 104 and the instant messaging server 105. The network 102 may include various connection types, such as wired and wireless communication links, fiber optic cables, or the like. The network 106 servers as a medium providing communication links among the universal identifier server 104, the instant messaging server 105, and the intelligent device 107. The network 106 may include various connection types, such as wired and wireless communication links, fiber optic cables, or the like.

A user can interact with the third-party server 105 through the network 102 to receive or send messages etc. by using the control terminal 101. Various client applications, such as third-party account login applications, intelligent device remote control applications, searching applications, instant messaging tools, email clients, social platform software, etc. may be installed on the control terminal 101. The control terminal 101 may be an electronic device having a display screen and supporting information input, including but not limited to smart phones, tablet computers, laptop portable computers, desktop computers, and the like. The user can also input a control instruction targeting at the controlled device on the control terminal 101 and send the control instruction to the instant messaging server 105 to forward the control instruction to the controlled device 107 through the instant messaging server 105.

The third-party server 103 may be a server that provides various services, such as a server that provides support for a third-party account login application displayed on the control terminal 101. The third-party server 103 can verify the account information received from the control terminal 101, generate a third-party token if the account information passes verification, and feed back the generated third-party token to the control terminal 101. Or, the third-party server can analyze a third-party token received from the universal identifier server 104 and feed back the user information corresponding to the third-party token to the universal identifier server 104.

The universal identifier server 104 may be a server that provides various services, for example, a server that provides support for an intelligent device remote control application displayed on the control terminal 101. The universal identifier server 104 can send the third-party token received from the control terminal to the third-party server, acquire user information corresponding to the third-party token from the third-party server, map the user information to obtain a control terminal universal identifier, send the control terminal universal identifier to the instant messaging server 105, and send a control terminal instant messaging token, which is generated by the instant messaging server 105 according to the control terminal universal identifier and received from the instant messaging server 105, to the control terminal 101. For another example, the universal identifier server 104 can also map a device identifier received from the intelligent device 107 to obtain a controlled device universal identifier, generate a universal identifier token according to the controlled device universal identifier, send the controlled device universal identifier to the instant messaging server 105, and send a controlled device instant messaging token and a universal identifier token, which are generated by the instant messaging server 105 according to the controlled device universal identifier and received from the instant messaging server 105, to the controlled device 107.

The instant messaging server 105 may be a server that provides various services, for example, a server that provides support for an intelligent device remote control application displayed on the control terminal 101. The instant messaging server 105 can generate a control terminal instant messaging token according to the control terminal universal identifier received from the universal identifier server 104 and send the generated control terminal instant messaging token to the universal identifier server 104. The instant messaging server 105 can also generate a controlled device instant messaging token according to a controlled device universal identifier received from the universal identifier server 104 and send the generated controlled device instant messaging token to the universal identifier server 104. The instant messaging server 105 can also determine whether to forward a control instruction to a target controlled device indicated by a target controlled device universal identifier according to the target controlled device universal identifier, the control instruction, and the control terminal instant messaging token received from the control terminal 101.

The controlled device 107 may be an intelligent electronic device having a network communication function. For example, the controlled device 107 may send a preset device identifier of the controlled device to the universal identifier server 104 when a start signal is detected. The controlled device 107 may also receive a controlled device instant messaging token and a universal identifier token sent by the universal identifier server 104 to communicate with the instant messaging server 105 by using the controlled device instant messaging token, and communicate with the universal identifier server 104 by using the universal identifier token.

It should be noted that the method for remote control of an intelligent device for a control terminal provided in the embodiments of the present disclosure is generally executed by the control terminal 101, and accordingly, the apparatus for remote control of an intelligent device for a control terminal is generally arranged in the control terminal 101. The method for remote control of an intelligent device for a controlled device provided in the embodiments of the present disclosure is generally executed by the controlled device 107, and accordingly, the apparatus for remote control of an intelligent device for a controlled device is generally arranged in the controlled device 107. The method for remote control of an intelligent device for a universal identifier server provided in the embodiments of the present disclosure is generally executed by the universal identifier server 104, and accordingly, the apparatus for remote control of an intelligent device for a universal identifier server is generally arranged in the universal identifier server 104. The method for remote control of an intelligent device for an instant messaging server provided in the embodiments of the present disclosure is generally executed by the instant messaging server 105, and accordingly, the apparatus for remote control of an intelligent device for an instant messaging server is generally arranged in the instant messaging server 105.

It should be appreciated that the numbers of the control terminal, the network, the controlled device, the universal identifier server and the instant messaging server in FIG. 1 are only schematic. According to an implementation need, any number of control terminals, networks, controlled devices, universal identifier servers, and instant messaging servers can be provided.

Figure 2:
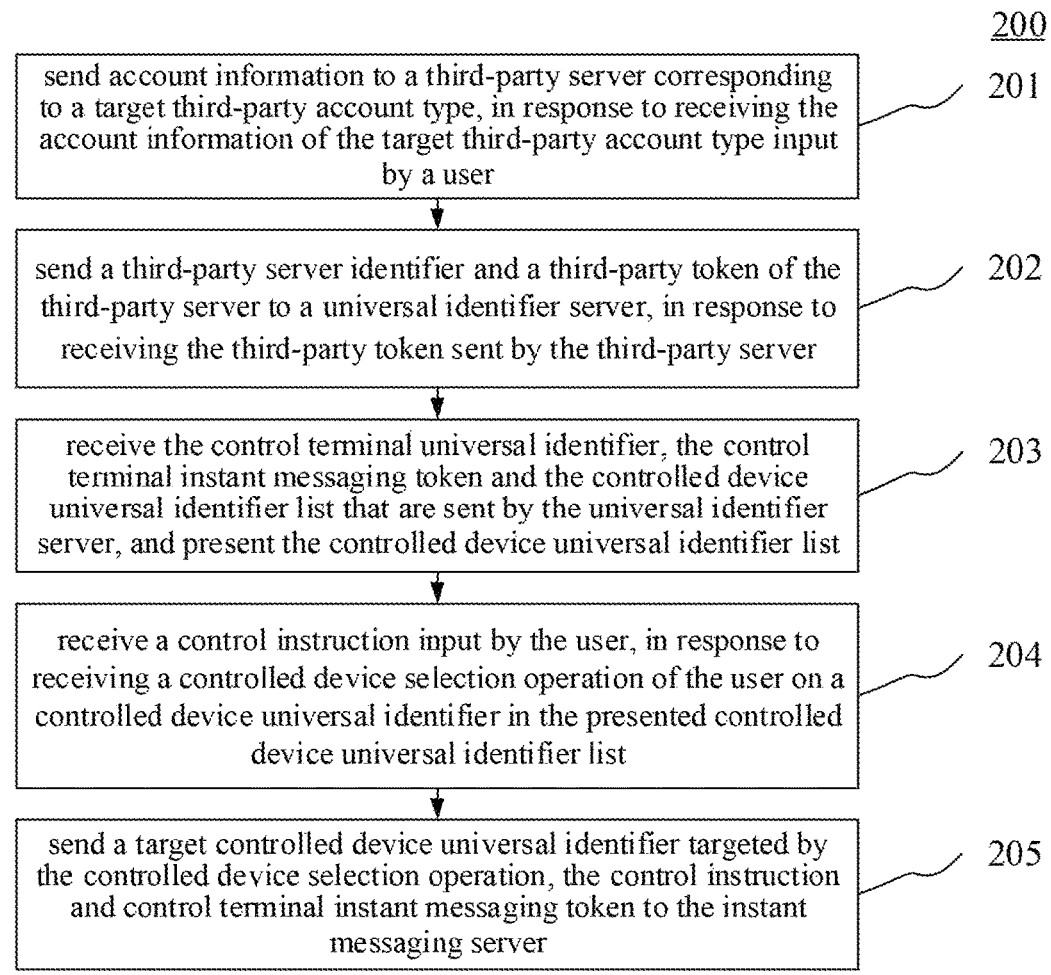
FIG. 2 is a flowchart of the method for remote control of an intelligent device for a control terminal according to an embodiment of the present disclosure.

Further referring to FIG. 2, it shows a flow 200 of the method for remote control of an intelligent device for a control terminal according to an embodiment of the present disclosure. The method for remote control of an intelligent device for a control terminal includes:

Step 201, sending account information to a third-party server corresponding to a target third-party account type in response to receiving the account information of the target third-party account type input by a user.

In the present embodiment, after receiving the account information of the target-third party account type input by the user, an electronic device (e.g., the control terminal shown in FIG. 1) on which the method for remote control of an intelligent device for a control terminal runs can send the account information input by the user to a third-party server corresponding to the target third-party account type. Here, the account information may include a user name and verification information. The verification information is information used to verify the user name. As an example, the verification information may be a password character string, verification voice, a face image, fingerprint information, or the like. After receiving the account information, the third-party server first verifies the account information and then generates a third-party token corresponding to the account information if the account information passes verification. Here, the third-party token is a temporary credential issued by the third-party server for requesting resources from the third-party server; when the electronic device that obtains the third-party token requests resources from the third-party server, the electronic device does not need to carry the user name and verification information, and only needs to carry the third-party token, and the third-party server will verify the third-party token; and if the third-party token passes the verification, the electronic device can obtain the required resources from the third-party server.

In the present embodiment, a software development kit of an application of the target third-party account type can be installed in the electronic device, whereby the user can input account information through a login interface provided by the software development kit of the application of the target-third party account type displayed on the electronic device.

In some optional implementations of the present embodiment, the method for remote control of an intelligent device for a control terminal may also include the following operations before step 201:

First, presenting information of at least one third-party account type.

Then, defining a third-party account type indicated by the information of the third-party account type targeted by an account type selection operation as the target third-party account type in response to receiving the account type selection operation of the user on the information of the third-party account type in the presented information of the at least one third-party account type.

Step 202, sending a third-party server identifier and the third-party token of the third-party server to a universal identifier server in response to receiving the third-party token sent by the third-party server.

In the present embodiment, after the account information is sent to the third-party server in step 201, the third-party server will return the third-party token as a temporary credential for requesting resources from the third-party server. Therefore, after receiving the third-party token sent by the third-party server, the electronic device can send the third-party server identifier of the third-party server and the third-party token to the universal identifier server. After receiving the third-party token, the universal identifier server will send the third-party token to the third-party server. After receiving the third-party token, the third-party server can verify the third-party token to acquire the user information corresponding to the third-party token if the third-party token passes verification, and finally send the acquired user information to the universal identifier server. The universal identifier server then receives the user information from the third-party server, then determines a control terminal universal identifier corresponding to the third-party server identifier and the user information, and then sends the determined control terminal universal identifier to the instant messaging server. After receiving the control terminal universal identifier, the instant messaging server can generate a control terminal instant messaging token according to the control terminal universal identifier and send the generated control terminal instant messaging token to the universal identifier server. Here, the control terminal instant messaging token is a temporary credential issued by the instant messaging server for acquiring resources from the instant messaging server; the electronic device that obtains the control terminal instant messaging token does not need to carry other verification information when requesting resources from the instant messaging server, but only needs to carry the control terminal instant messaging token; the instant messaging server will verify the control terminal instant messaging token; and if the control terminal instant messaging token passes verification, the required resources can be obtained from the instant messaging server. The universal identifier server can receive the control terminal instant messaging token sent by the instant messaging server and acquire a controlled device universal identifier list corresponding to the control terminal universal identifier. Here, the universal identifier server may store a controlled device universal identifier list corresponding to each control terminal universal identifier. Finally, the universal identifier server will feed back the control terminal universal identifier, the control terminal instant messaging token and the controlled device universal identifier list to the electronic device.

Step 203, receiving the control terminal universal identifier, the control terminal instant messaging token and the controlled device universal identifier list sent by the universal identifier server, and presenting the controlled device universal identifier list;

In the present embodiment, the electronic device on which the method for remote control of an intelligent device for a control terminal can receive the control terminal universal identifier, the control terminal instant messaging token and the controlled device universal identifier list sent by the universal identifier server, and present the controlled device universal identifier list;

Step 204, receiving a control instruction input by the user in response to receiving a controlled device selection operation of the user on a controlled device universal identifier in the presented controlled device universal identifier list.

In the present embodiment, the electronic device can receive the control instruction input by the user after receiving the controlled device selection operation of the user on the controlled device universal identifier in the presented controlled device universal identifier list. Here, the control instruction is used for operating the controlled device. For example, the control instruction may be an instruction to acquire state information of the controlled device, and the control instruction may also be an instruction to change operating parameters of the controlled device, such as to increase a target temperature value of an intelligent air conditioner.

Step 205, sending a target controlled device universal identifier targeted by the controlled device selection operation, the control instruction and control terminal instant messaging token to the instant messaging server.

In the present embodiment, the electronic device (e.g., the control terminal shown in FIG. 1) can send the target controlled device universal identifier targeted by the received controlled device selection operation in step 204, the control instruction input by the user, and the control terminal instant messaging token received from the universal identifier server in step 203 to the instant messaging server. The instant messaging server can verify the received control terminal instant messaging token, and if the control terminal instant messaging token passes verification, the received control instruction is forwarded to a target controlled device indicated by the received target controlled device universal identifier. On the contrary, if the verification fails, the control instruction forwarding operation will not be executed.

Figure 3:
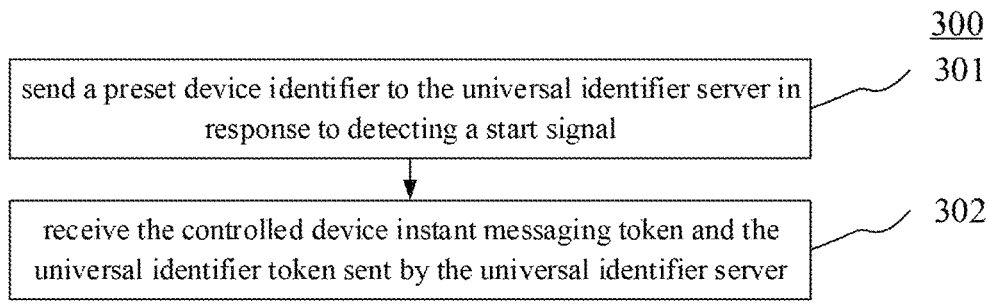
FIG. 3 is a flowchart of the method for remote control of an intelligent device for a controlled device according to an embodiment of the present disclosure.

Further referring to FIG. 3, FIG. 3 is a flow diagram 300 of the method for remote control of an intelligent device for a controlled device according to an embodiment of the present disclosure. The method for remote control of an intelligent device for a controlled device includes:

Step 301, sending a preset device identifier to the universal identifier server in response to detecting a start signal.

In the present embodiment, the electronic device (for example, the controlled device shown in FIG. 1) on which the method for remote control of an intelligent device for a controlled device runs can send the preset device identifier of the electronic device to the universal identifier server after a start signal is detected, that is, after the controlled device is powered on. Here, the preset device identifier of the electronic device may be a device identifier for distinguishing the controlled device. As an example, the preset device identifier of the controlled device may be a serial number (SN) code of the controlled device, an international mobile equipment identity (IMEI) code of a general packet radio service (GPRS) module of the controlled device or a media access control (MAC) address of a wireless fidelity (WIFI) module of the controlled device. In this way, the universal identifier server can determine a controlled device universal identifier corresponding to the received preset device identifier, generate a universal identifier token according to the controlled device universal identifier, and send the controlled device universal identifier to the instant messaging server. The instant messaging server can generate a controlled device instant messaging token according to the received controlled device universal identifier and send the generated controlled device instant messaging token to the universal identifier server. The universal identifier server can send the generated universal identifier token and the controlled device instant messaging token received from the instant messaging server to the electronic device.

Step 302, receiving the controlled device instant messaging token and the universal identifier token sent by the universal identifier server.

In the present embodiment, the electronic device (e.g., the controlled device shown in FIG. 1) on which the method for remote control of an intelligent device for a controlled device runs can receive the controlled device instant messaging token received from the instant messaging server and the universal identifier token generated by the universal identifier server that are sent by the universal identifier server, so that the electronic device can communicate with the instant messaging server by using the controlled device instant messaging token and can also communicate with the universal identifier server by using the universal identifier token.

Here, the controlled device instant messaging token is a temporary credential issued by the instant messaging server for requesting resources from the instant messaging server; the electronic device that obtains the controlled device instant messaging token does not need to carry other verification information when requesting resources from the instant messaging server, but only needs to carry the controlled device instant messaging token; the instant messaging server will verify the controlled device instant messaging token; and if the controlled device instant messaging token passes verification, the required resources can be obtained from the instant messaging server.

Here, the universal identifier token is a temporary credential issued by the universal identifier server for requesting resources from the universal identifier server; the electronic device that obtains the universal identifier token does not need to carry other verification information when requesting resources from the universal identifier server, but only needs to carry the universal identifier token; and the universal identifier server will verify the universal identifier token; and if the universal identifier token passes the verification, the required resources can be obtained from the universal identifier server.

As an example, when the control terminal sends a control instruction for acquiring device state information of the electronic device to the electronic device, the electronic device can send the controlled device instant messaging token and the state information of the electronic device to the instant messaging server, and the instant messaging server will forward the state information of the electronic device to the control terminal after the instant messaging token of the controlled device is verified.

Figure 4:
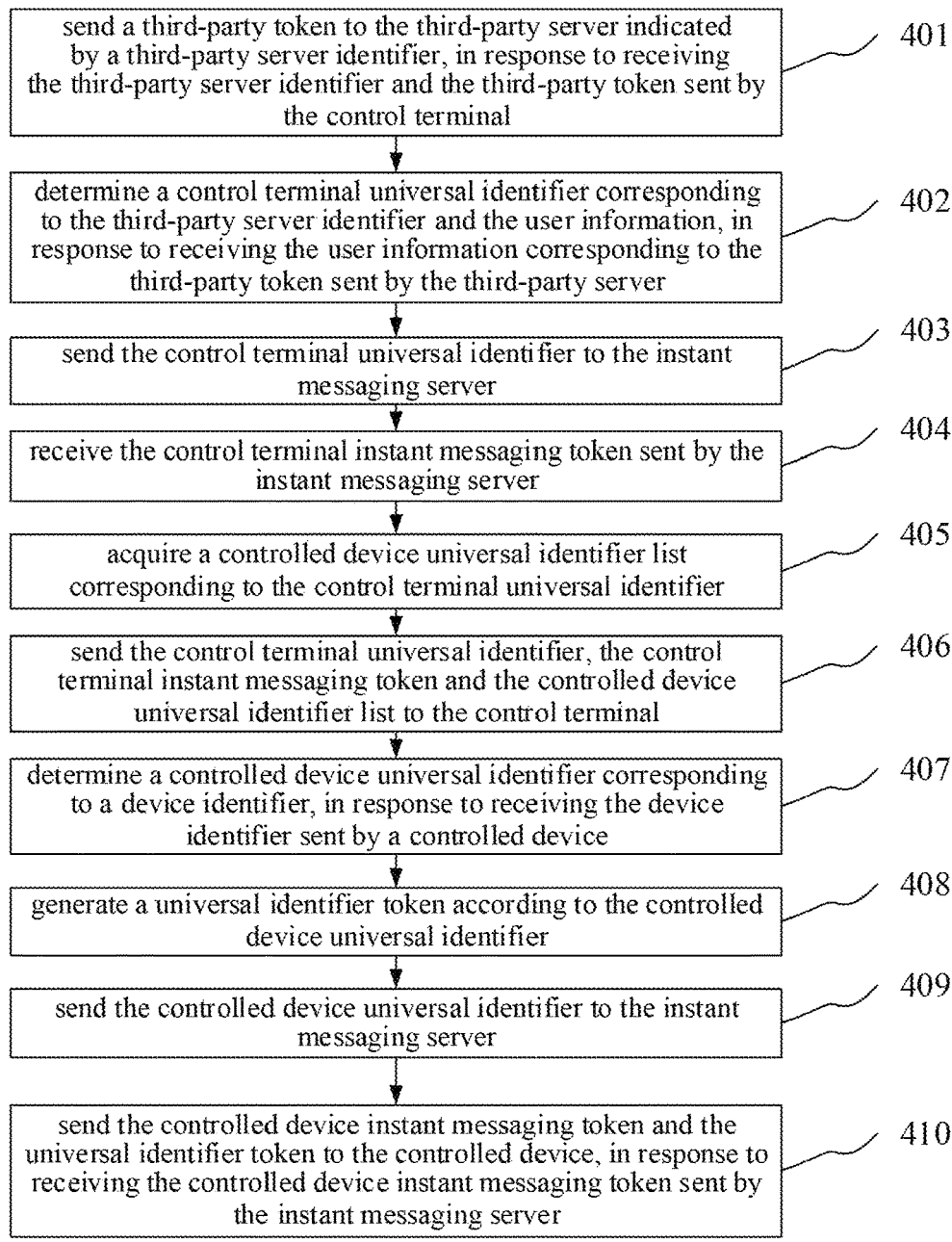
FIG. 4 is a flowchart of the method for remote control of an intelligent device for a universal identifier server according to an embodiment of the present disclosure.

Further referring to FIG. 4, it shows a flow 400 of the method for remote control of an intelligent device for a universal identifier server. The flow 400 of the method for remote control of an intelligent device for a universal identifier server includes:

Step 401, in response to receiving a third-party server identifier and a third-party token sent by a control terminal, sending the third-party token to a third-party server indicated by the third-party server identifier.

In the present embodiment, after receiving the third-party server identifier and the third-party token sent by the control terminal, the electronic device (e.g., the universal identifier server shown in FIG. 1) on which the method for remote control of an intelligent device for a universal identifier server runs can send the received third-party token to the third-party server indicated by the third-party server identifier. Thus, the third-party server can verify the third-party token, acquire user information corresponding to the third-party token if the third-party token passes verification, and finally send the acquired user information to the electronic device.

Step 402, in response to receiving the user information corresponding to the third-party token sent by the third-party server, determining a control terminal universal identifier corresponding to the third-party server identifier and the user information.

In the present embodiment, after receiving the user information corresponding to the third-party token sent by the third-party server, the electronic device can determine a control terminal universal identifier corresponding to the third-party server identifier and the user information.

In some optional implementations of the present embodiment, step 402 can be carried out as follows:

First, querying a control terminal universal identifier corresponding to the third-party server identifier and the user information in a first preset database, wherein the first preset database correspondingly stores the third-party server identifier, the user information and the control terminal universal identifier.

Second, defining the found control terminal universal identifier as the control terminal universal identifier corresponding to the third-party server identifier and the user information if the control terminal universal identifier corresponding to the third-party server identifier and the user information is found.

Finally, generating the control terminal universal identifier corresponding to the third-party server identifier and the user information according to a preset universal identifier format, and correspondingly storing the generated control terminal universal identifier, the third-party server identifier and the user information into the first preset database, if the control terminal universal identifier corresponding to the third-party server identifier and the user information is not found.

Step 403, sending the control terminal universal identifier to the instant messaging server.

In the present embodiment, the electronic device can send the control terminal universal identifier determined in step 402 to the instant messaging server. In this way, the instant messaging server can generate a control terminal instant messaging token according to the received control terminal universal identifier. Here, the control terminal instant messaging token is a temporary credential issued by the instant messaging server to acquire resources from the instant messaging server; the electronic device that obtains the control terminal instant messaging token does not need to carry other verification information when requesting resources from the instant messaging server, but only needs to carry the control terminal instant messaging token; the instant messaging server will verify the control terminal instant messaging token; and if the control terminal instant messaging token passes verification, the required resources can be obtained from the instant messaging server.

Step 404, receiving the control terminal instant messaging token sent by the instant messaging server.

Step 405, acquiring a controlled device universal identifier list corresponding to the control terminal universal identifier.

Here, the electronic device may store the controlled device universal identifier list corresponding to each control terminal universal identifier.

Step 406, sending the control terminal universal identifier, the control terminal instant messaging token and the controlled device universal identifier list to the control terminal.

Here, the electronic device can send the control terminal universal identifier corresponding to the third-party server identifier and user information and determined in step 402, the control terminal instant messaging token sent by the instant messaging server and received in step 404, and the controlled device universal identifier list corresponding to the control terminal universal identifier and obtained in step 405 to the control terminal. In this way, the control terminal can present the controlled device universal identifier list, receive the control instruction input by the user after receiving the controlled device selection operation of the user on a controlled device universal identifier in the presented controlled device universal identifier list, and send a target controlled device universal identifier targeted by the controlled device selection operation to the instant messaging server, the control instruction and the control terminal instant messaging token.

Step 407, in response to receiving a device identifier sent by a controlled device, determining a controlled device universal identifier corresponding to the device identifier.

In the present embodiment, after receiving the device identifier sent by the controlled device, the electronic device (e.g., the universal identifier server shown in FIG. 1) on which the method for remote control of an intelligent device for a universal identifier server runs can determine the controlled device universal identifier corresponding to the device identifier.

In some optional implementations of the present embodiment, step 407 can be carried out as follows:

First, querying the controlled device universal identifier corresponding to the device identifier in a second preset database.

Second, defining the found controlled device universal identifier as the controlled device universal identifier corresponding to the device identifier if the controlled device universal identifier corresponding to the device identifier is found.

Finally, generating the controlled device universal identifier corresponding to the device identifier according to the preset universal identifier format and correspondingly storing the generated controlled device universal identifier and the device identifier into the second preset database if the controlled device universal identifier corresponding to the device identifier is not found.

In some optional implementations of the present embodiment, each of the control terminal universal identifier in the first preset database and each of the controlled device universal identifier in the second preset database can be different from each other.

Step 408, generating a universal identifier token according to the controlled device universal identifier.

Here, since the controlled device uploads a preset device identifier only when the device is powered on, and the electronic device determines the controlled device universal identifier corresponding to the preset device identifier in step 407, in order to ensure the subsequent communication security with the controlled device, various encryption methods can be used to generate a universal identifier token according to the controlled device universal identifier determined in step 407. As an example, advanced encryption standard (AES) encryption, secure hash algorithm (SHA) encryption, AES+SHA encryption or other encryption methods can be used to generate a universal identifier token.

Here, the universal identifier token is a temporary credential issued by the universal identifier server for requesting resources from the universal identifier server; the electronic device that obtains the universal identifier token does not need to carry other verification information when requesting resources from the universal identifier server, but only needs to carry the universal identifier token; and the universal identifier server will verify the universal identifier token; and if the universal identifier token passes the verification, the required resources can be obtained from the universal identifier server.

Step 409, sending the controlled device universal identifier to the instant messaging server.

In the present embodiment, the electronic device can send the controlled device universal identifier corresponding to the preset device identifier and determined in step 407 to the instant messaging server. In this way, the instant messaging server can generate a controlled device instant messaging token according to the controlled device universal identifier. Here, the controlled device instant messaging token is a temporary credential issued by the instant messaging server for requesting resources from the instant messaging server; the electronic device that obtains the controlled device instant messaging token does not need to carry other verification information when requesting resources from the instant messaging server, but only needs to carry the controlled device instant messaging token; the instant messaging server will verify the controlled device instant messaging token; and if the controlled device instant messaging token passes verification, the required resources can be obtained from the instant messaging server.

Step 410, sending the controlled device instant messaging token and the universal identifier token to the controlled device in response to receiving the controlled device instant messaging token sent by the instant messaging server.

In the present embodiment, after receiving the controlled device instant messaging token sent by the instant messaging server, the electronic device can send the controlled device instant messaging token and the universal identifier token to the controlled device. In this way, the controlled device can communicate with the instant messaging server by using the controlled device instant messaging token and communicate with the electronic device by using the universal identifier token.

Figure 5:
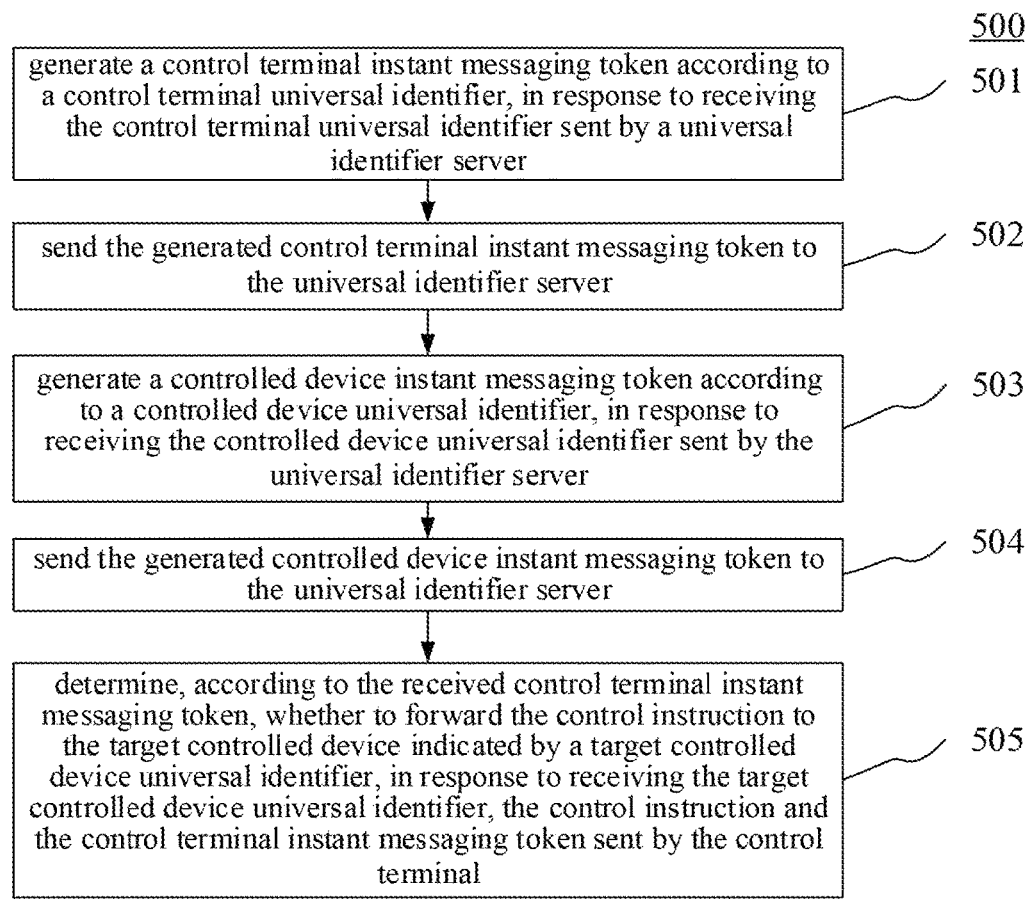
FIG. 5 is a flowchart of the method for remote control of an intelligent device for an instant messaging server according to an embodiment of the present disclosure.

Further referring to FIG. 5, FIG. 5 is a flow diagram 500 of the method for remote control of an intelligent device for an instant messaging server according to an embodiment of the present disclosure. The method for remote control of an intelligent device for an instant messaging server includes:

Step 501, in response to receiving a control terminal universal identifier sent by a universal identifier server, generating a control terminal instant messaging token according to the control terminal universal identifier.

In the present embodiment, after receiving the control terminal universal identifier sent by the universal identifier server, the electronic device (e.g., the instant messaging server shown in FIG. 1) on which the method for remote control of an intelligent device for a universal identifier server runs can generate the control terminal instant messaging token according to the control terminal universal identifier. Here, the control terminal instant messaging token is a temporary credential issued by the instant messaging server for acquiring resources from the instant messaging server; the electronic device that obtains the control terminal instant messaging token does not need to carry other verification information when requesting resources from the instant messaging server, but only needs to carry the control terminal instant messaging token; the instant messaging server will verify the control terminal instant messaging token; and if the control terminal instant messaging token passes verification, the required resources can be obtained from the instant messaging server.

Step 502, sending the generated control terminal instant messaging token to the universal identifier server.

In the present embodiment, the electronic device can send the control terminal instant messaging token generated in step 501 to the universal identifier server. In this way, the universal identifier server can send the received control terminal instant messaging token to the control terminal.

Step 503, in response to receiving a controlled device universal identifier sent by the universal identifier server, generating a controlled device instant messaging token according to the controlled device universal identifier.

In the present embodiment, after receiving the controlled device universal identifier sent by the universal identifier server, the electronic device can generate the controlled device instant messaging token according to the controlled device universal identifier. Here, the controlled device instant messaging token is a temporary credential issued by the instant messaging server for requesting resources from the instant messaging server; the electronic device that obtains the controlled device instant messaging token does not need to carry other verification information when requesting resources from the instant messaging server, but only needs to carry the controlled device instant messaging token; the instant messaging server will verify the controlled device instant messaging token; and if the controlled device instant messaging token passes verification, the required resources can be obtained from the instant messaging server.

Step 504, sending the generated controlled device instant messaging token to the universal identifier server.

In the present embodiment, the electronic device can send the controlled device instant messaging token generated in step 503 to the universal identifier server. In this way, the universal identifier server can send the received controlled device instant messaging token to the controlled device.

Step 505, in response to receiving a target controlled device universal identifier, a control instruction and a control terminal instant messaging token that are sent by a control terminal, determining, according to the received control terminal instant messaging token, whether to forward the control instruction to a target controlled device indicated by the target controlled device universal identifier.

In the present embodiment, after receiving the target controlled device universal identifier, the control instruction and the control terminal instant messaging token that are sent by the control terminal, the electronic device can verify the received control terminal instant messaging token and forward the received control instruction to a target controlled device indicated by the received target controlled device universal identifier if the received control terminal instant messaging token passes the verification. On the contrary, if the verification fails, the control instruction forwarding operation will not be executed.

Figure 6:
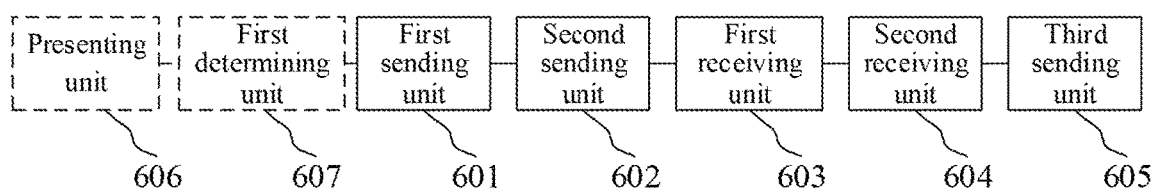
FIG. 6 is a schematic structural diagram of the apparatus for remote control of an intelligent device for a control terminal according to an embodiment of the present disclosure.

Further referring to FIG. 6, as the implementation of the method shown in the above figures, the present disclosure provides an embodiment of an apparatus for remote control of an intelligent device for a control terminal, the embodiment of the apparatus corresponds to the embodiment of the method shown in FIG. 2, and the apparatus can be specifically applied to various types of electronic devices.

As shown in FIG. 6, the apparatus 600 for remote control of an intelligent device for a control terminal in the present embodiment includes a first sending unit 601, a second sending unit 602, a first receiving unit 603, a second receiving unit 604, and a third sending unit 605. The first sending unit 601 is for, in response to receiving account information of a target third-party account type input by a user, sending the account information to a third-party server corresponding to the target third-party account type for the third-party server to generate a third-party token corresponding to the account information; the second sending unit 602 is for, in response to receiving the third-party token sent by the third-party server, sending a third-party server identifier and the third-party token of the third-party server to a universal identifier server, for the universal identifier server to send the third-party token to the third-party server, receive user information corresponding to the third-party token from the third-party server, determine a control terminal universal identifier corresponding to the third-party server identifier and the user information, send the control terminal universal identifier to an instant messaging server, receive a control terminal instant messaging token generated by the instant messaging server according to the control terminal universal identifier from the instant messaging server, and acquire a controlled device universal identifier list corresponding to the control terminal universal identifier; the first receiving unit 603 is for receiving the control terminal universal identifier, the control terminal instant messaging token and the controlled device universal identifier list that are sent by the universal identifier server, and presenting the controlled device universal identifier list; the second receiving unit 604 is for receiving a control instruction input by the user in response to receiving a controlled device selection operation of the user on a controlled device universal identifier in the presented controlled device universal identifier list; and the third sending unit 605 is for sending a target controlled device universal identifier targeted by the controlled device selection operation, the control instruction and the control terminal instant messaging token to the instant messaging server for the instant messaging server to determine whether to forward the control instruction to a target controlled device indicated by the target controlled device universal identifier according to the control terminal instant messaging token.

In the present embodiment, the specific processing of the first sending unit 601, the second sending unit 602, the first receiving unit 603, the second receiving unit 604 and the third sending unit 605 of the apparatus 600 for remote control of an intelligent device for a control terminal and the technical effects brought by them can refer to the related descriptions of steps 201, 202, 203, 204 and 205 in the corresponding embodiment of FIG. 2 respectively, and will not be repeated here.

In some optional implementations of the present embodiment, the apparatus 600 may further include: a presenting unit 606, for presenting information of at least one third-party account type; and a first determining unit 607, for defining the third-party account type indicated by the information of the third-party account type targeted by an account type selection operation as a target third-party account type in response to receiving the account type selection operation of the user on the information of the third-party account type in the presented information of the at least one third-party account type.

In some optional implementations of the present embodiment, the generating the third-party token corresponding to the account information by the third-party server may include: generating the third-party token corresponding to the account information by the third-party server in response to that the account information passes verification.

Figure 7:
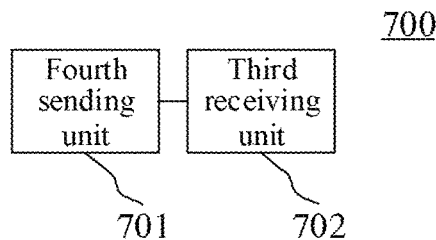
FIG. 7 is a schematic structural diagram of the apparatus for remote control of an intelligent device for a controlled device according to an embodiment of the present disclosure.

Further referring to FIG. 7, as the implementation of the method shown in the above figures, the present disclosure provides an embodiment of an apparatus for remote control of an intelligent device for a controlled device, the embodiment of the apparatus corresponds to the embodiment of the method shown in FIG. 3, and the apparatus can be specifically applied to various types of electronic devices.

As shown in FIG. 7, the apparatus 700 for remote control of an intelligent device for a controlled device in the present embodiment includes a fourth sending unit 701 and a third receiving unit 702. The fourth sending unit 701 is for, in response to detecting a start signal, sending a preset device identifier to a universal identifier server for the universal identifier server to determine a controlled device universal identifier corresponding to the preset device identifier, generate a universal identifier token according to the controlled device universal identifier, send the controlled device universal identifier to an instant messaging server, and receive, from the instant messaging server, a controlled device instant messaging token generated according to the controlled device universal identifier by the instant messaging server; and the third receiving unit 702 is for receiving the controlled device instant messaging token and the universal identifier token sent by the universal identifier server to communicate with the instant messaging server by using the controlled device instant messaging token and communicate with the universal identifier server by using the universal identifier token.

In the present embodiment, the specific processing of the fourth sending unit 701 and the third receiving unit 703 of the apparatus 700 for remote control of an intelligent device for a controlled device and the technical effects brought by them can refer to the related descriptions of steps 301 and 302 in the corresponding embodiment of FIG. 3 respectively, and will not be repeated here.

Hereinafter, referring to FIG. 8, as the implementation of the method shown in the above figures, the present disclosure provides an embodiment of an apparatus for remote control of an intelligent device for a universal identifier server, the embodiment of the apparatus corresponds to the embodiment of the method shown in FIG. 4, and the apparatus can be specifically applied to various types of electronic devices.

Figure 8:
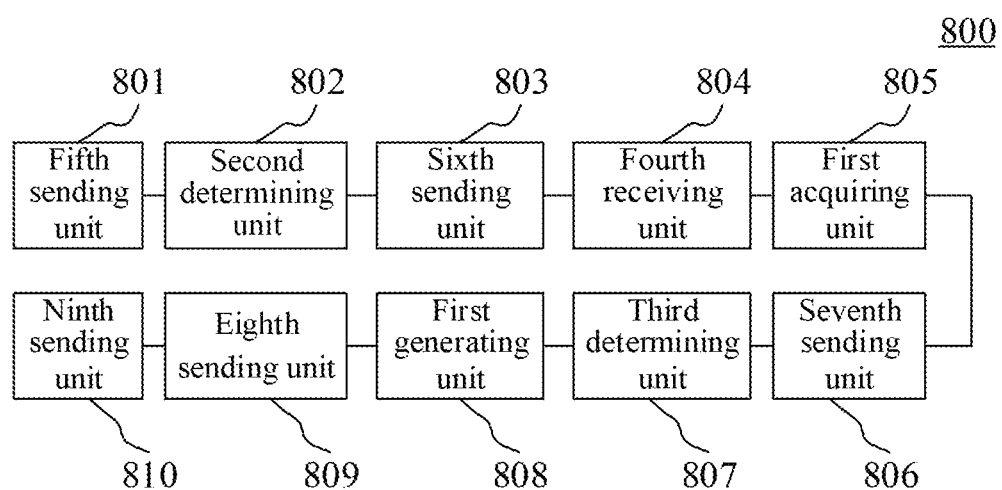
FIG. 8 is a schematic structural diagram of the apparatus for remote control of an intelligent device for a universal identifier server according to an embodiment of the present disclosure.

As shown in FIG. 8, the apparatus 800 for remote control of an intelligent device for a universal identifier server in the present embodiment includes a fifth sending unit 801, a second determining unit 802, a sixth sending unit 803, a fourth receiving unit 804, a first acquiring unit 805, a seventh sending unit 806, a third determining unit 807, a first generating unit 808, an eighth sending unit 809 and a ninth sending unit 810. The fifth sending unit 801 is for, in response to receiving a third-party server identifier and a third-party token sent by a control terminal, sending the third-party token to a third-party server indicated by the third-party server identifier for the third-party server to determine user information corresponding to the received third-party token according to the received third-party token; the second determining unit 802 for, in response to receiving the user information corresponding to the third-party token sent by the third-party server, determining a control terminal universal identifier corresponding to the third-party server identifier and the user information; the sixth sending unit 803 is for sending the control terminal universal identifier to an instant messaging server for the instant messaging server to generate a control terminal instant messaging token according to the control terminal universal identifier; the fourth receiving unit 804 is for receiving the control terminal instant messaging token sent by the instant messaging server; the first acquiring unit 805 is for acquiring a controlled device universal identifier list corresponding to the control terminal universal identifier; the seventh sending unit 806 is for sending the control terminal universal identifier, the control terminal instant messaging token and the controlled device universal identifier list to the control terminal; the third determining unit 807 is for determining a controlled device universal identifier corresponding to the device identifier in response to receiving the device identifier sent by the controlled device; the first generating unit 808 is for generating a universal identifier token according to the controlled device universal identifier; the eighth sending unit 809 is for sending the controlled device universal identifier to an instant messaging server for the instant messaging server to generate a controlled device instant messaging token according to the controlled device universal identifier; and the ninth sending unit 810 is for, in response to receiving the controlled device instant messaging token sent by the instant messaging server, sending the controlled device instant messaging token and the universal identifier token to the controlled device for the controlled device to communicate with the instant messaging server by using the controlled device instant messaging token, and communicate with the universal identifier server by using the universal identifier token.

In the present embodiment, the specific processing of the fifth sending unit 801, the second determining unit 802, the sixth sending unit 803, the fourth receiving unit 804, the first acquiring unit 805, the seventh sending unit 806, the third determining unit 807, the first generating unit 808, the eighth sending unit 809 and the ninth sending unit 810 of the apparatus 800 for remote control of an intelligent device for a universal identifier server and the technical effects brought by them can refer to the related descriptions of steps 401 to 410 in the corresponding embodiment of FIG. 4 respectively, and will not be repeated here.

In some optional implementations of the present embodiment, the second determining unit 802 may include a first query module (not shown), for querying a control terminal universal identifier corresponding to the third-party server identifier and the user information in a first preset database, wherein the first preset database correspondingly stores the third-party server identifier, the user information, and the control terminal universal identifier; a first determining module (not shown), for defining the found control terminal universal identifier as a control terminal universal identifier corresponding to the third-party server identifier and the user information in response to finding the control terminal universal identifier corresponding to the third-party server identifier and the user information; and a first generating and storing module (not shown), for generating a control terminal universal identifier corresponding to the third-party server identifier and the user information according to a preset universal identifier format in response to not finding the control terminal universal identifier corresponding to the third-party server identifier and the user information, and correspondingly storing the generated control terminal universal identifier, the third-party server identifier and the user information into the first preset database.

In some optional implementations of the present embodiment, the third determining unit 807 may include a second query module (not shown), for querying a controlled device universal identifier corresponding to the device identifier in a second preset database; a second determining module (not shown), for defining the found controlled device universal identifier as a controlled device universal identifier corresponding to the device identifier in response to finding the controlled device universal identifier corresponding to the device identifier; and a second generating and storing module (not shown) for generating a controlled device universal identifier corresponding to the device identifier according to a preset universal identifier format in response to not finding the controlled device universal identifier corresponding to the device identifier, and correspondingly storing the generated controlled device universal identifier and the device identifier into the second preset database.

In some optional implementations of the present embodiment, each of the control terminal universal identifier in the first preset database and each of the controlled device universal identifier in the second preset database are different from each other.

Figure 9:
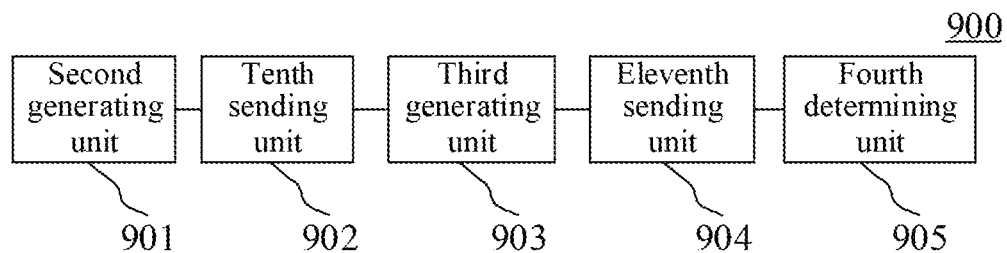
FIG. 9 is a schematic structural diagram of the apparatus for remote control of an intelligent device for an instant messaging server according to an embodiment of the present disclosure.

Further refer to FIG. 9, as the implementation of the method shown in the above figures, the present disclosure provides an embodiment of an apparatus for remote control of an intelligent device for an instant messaging server, the embodiment of the apparatus corresponds to the embodiment of the method shown in FIG. 5, and the apparatus can be specifically applied to various types of electronic devices.

As shown in FIG. 9, the apparatus 900 for remote control of an intelligent device for an instant messaging server in the present embodiment includes a second generating unit 901, a tenth sending unit 902, a third generating unit 903, an eleventh sending unit 904, and a fourth determining unit 905. The second generating unit 901 is for, in response to receiving a control terminal universal identifier sent by a universal identifier server, generating a control terminal instant messaging token according to the control terminal universal identifier; the tenth sending unit 902 is for sending the generated control terminal instant messaging token to the universal identifier server; the third generating unit 903 is for generating a controlled device instant messaging token according to the controlled device universal identifier in response to receiving the controlled device universal identifier sent by the universal identifier server; the eleventh sending unit 904 is for sending the generated controlled device instant messaging token to the universal identifier server; and the fourth determining unit 905 is for, in response to receiving a target controlled device universal identifier, a control instruction and the control terminal instant messaging token sent by the control terminal, determining, according to the received control terminal instant messaging token, whether to forward the control instruction to a target controlled device indicated by the target controlled device universal identifier.

In the present embodiment, the specific processing of the second generating unit 901, the tenth sending unit 902, the third generating unit 903, the eleventh sending unit 904 and the fourth determining unit 905 of the apparatus 900 for remote control of an intelligent device for an instant messaging server and the technical effects brought by them can refer to the related descriptions of steps 501 to 505 in the corresponding embodiment of FIG. 5 respectively, and will not be repeated here.

Hereinafter, referring to FIGS. 10A and 10B, which show sequence diagrams of a system for remote control of an intelligent device according to an embodiment of the present disclosure.

Figure 10A:
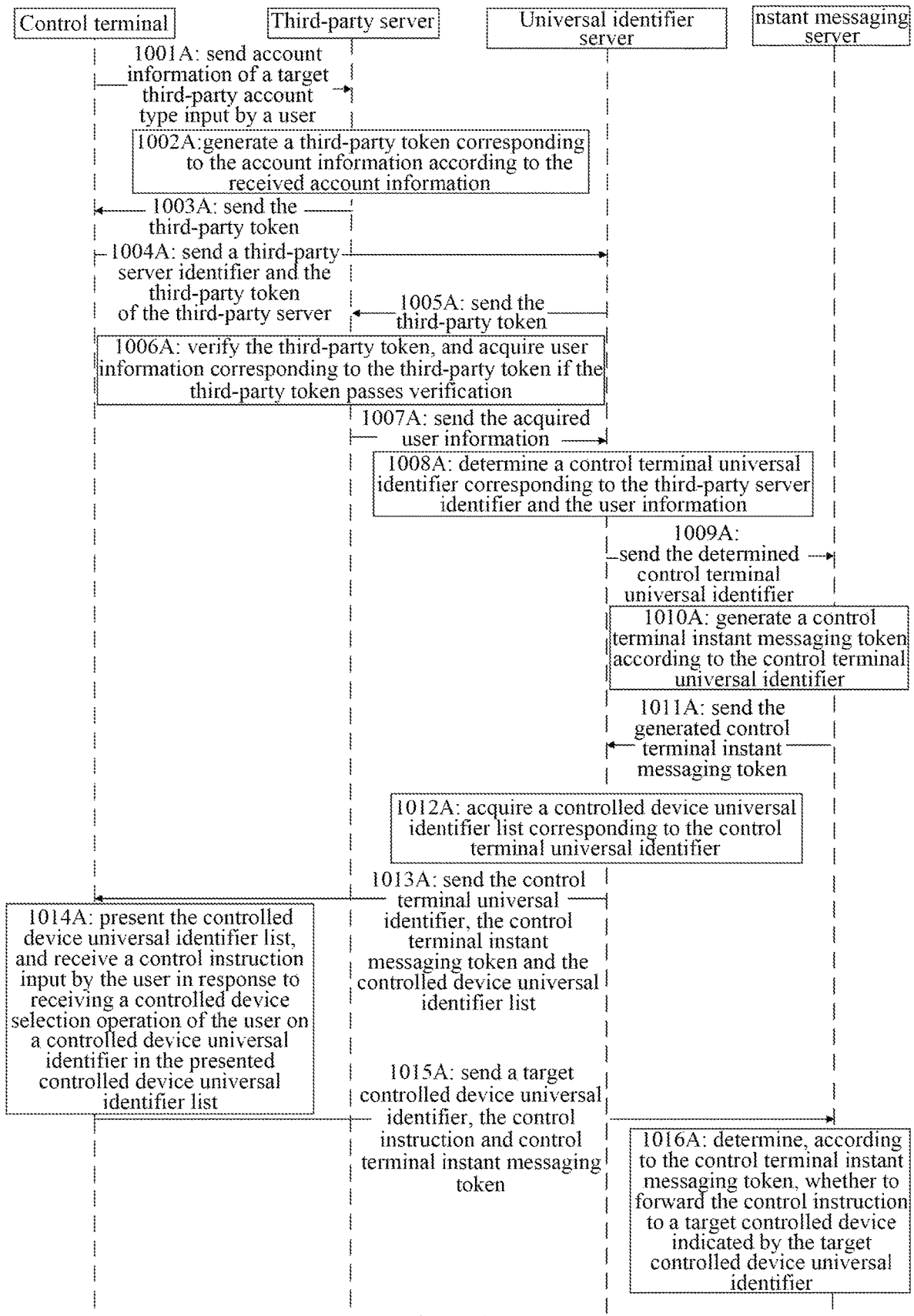
FIGS. 10A and 10B are sequence diagrams of a system for remote control of an intelligent device according to an embodiment of the present disclosure.
Figure 10B:
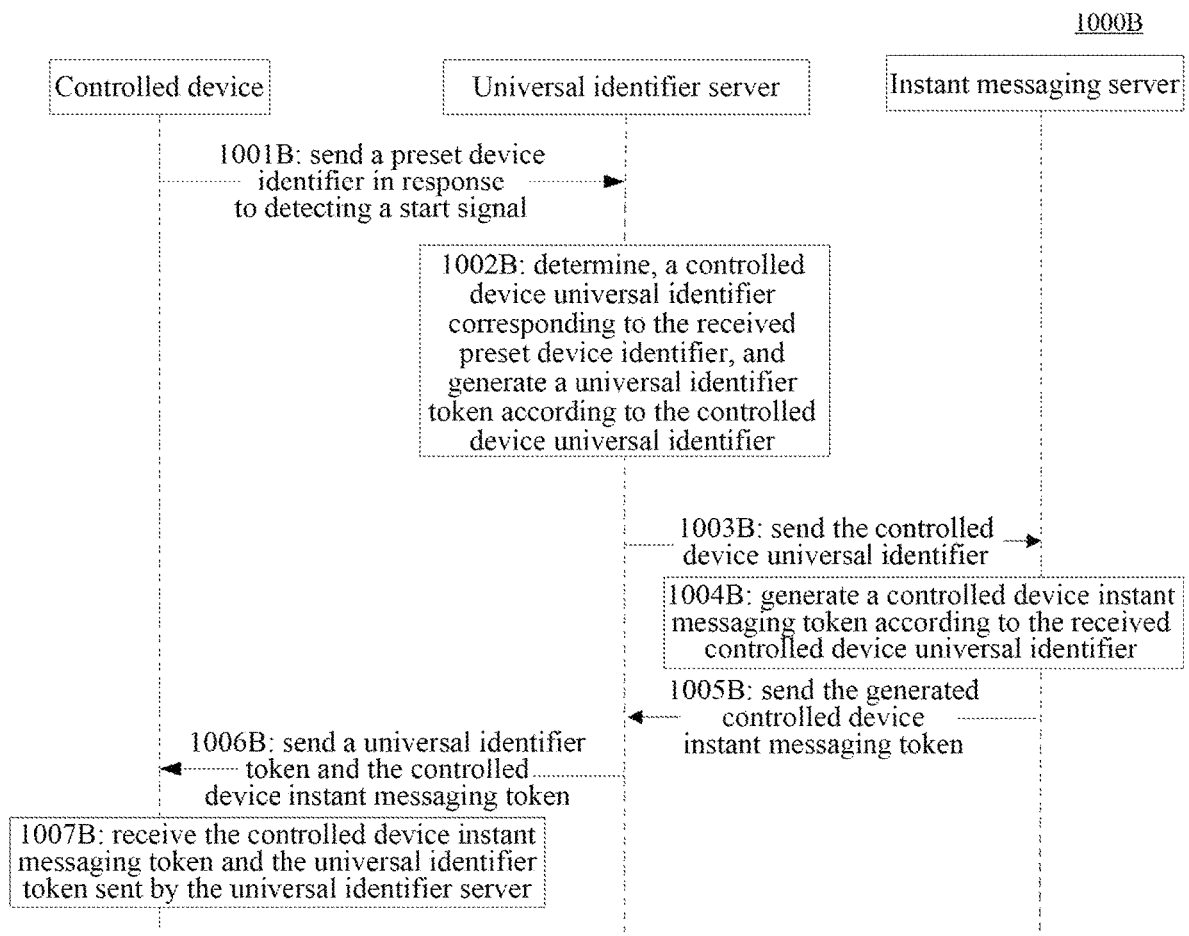

As shown in FIGS. 10A and 10B, the system for remote control of an intelligent device in the present embodiment may include a control terminal, a controlled device, a universal identifier server, an instant messaging server, and a third-party server. The control terminal can implement the method for remote control of an intelligent device for a control terminal as shown in FIG. 2, the controlled device can implement the method for remote control of an intelligent device for a controlled device as shown in FIG. 3, the universal identifier server can implement the method for remote control of an intelligent device for a universal identifier server as shown in FIG. 4, and the instant messaging server can implement the method for remote control of an intelligent device for an instant messaging server as shown in FIG. 5. The third-party server can provide support for a third-party account type.

The main process of the sequence among the control terminal, the third-party server, the universal identifier server and the instant messaging server in the present embodiment is as follows:

The control terminal sends account information to the third-party server corresponding to a target third-party account type in response to receiving the account information of the target third-party account type input by a user. The third-party server generates a third-party token corresponding to the account information according to the received account information, and then sends the generated third-party token to the control terminal. The control terminal sends a third-party server identifier and the third-party token of the third-party server to the universal identifier server in response to receiving the third-party token sent by the third-party server. The universal identifier server sends the third-party token to the third-party server. After receiving the third-party token, the third-party server verifies the third-party token to obtain the user information corresponding to the third-party token if the third-party token passes verification, and finally send the obtained user information to the universal identifier server. The universal identifier server then receives the user information from the third-party server, then determines a control terminal universal identifier corresponding to the third-party server identifier and the user information, and then sends the determined control terminal universal identifier to the instant messaging server. After receiving the control terminal universal identifier, the instant messaging server generates a control terminal instant messaging token according to the control terminal universal identifier and sends the generated control terminal instant messaging token to the universal identifier server. The universal identifier server receives the control terminal instant messaging token sent by the instant messaging server, acquires a controlled device universal identifier list corresponding to the control terminal universal identifier, and sends the control terminal universal identifier, the control terminal instant messaging token and the controlled device universal identifier list to the control terminal. The control terminal receives the control terminal universal identifier, the control terminal instant messaging token and the controlled device universal identifier list that are sent by the universal identifier server, and presents the controlled device universal identifier list. The control terminal receives a control instruction input by the user in response to receiving a controlled device selection operation of the user on a controlled device universal identifier in the presented controlled device universal identifier list. The control terminal sends a target controlled device universal identifier targeted by the controlled device selection operation, the control instruction and control terminal instant messaging token to the instant messaging server. The instant messaging server determines whether to forward the control instruction to a target controlled device indicated by the target controlled device universal identifier according to the control terminal instant messaging token.

Referring to FIG. 10A specifically:

In step 1001A, the control terminal sends account information to the third-party server corresponding to a target third-party account type in response to receiving the account information of the target third-party account type input by a user.

In step 1002A, the third-party server generates a third-party token corresponding to the account information according to the received account information.

In step 1003A, the third-party server sends the generated third-party token to the control terminal.

In step 1004A, the control terminal sends a third-party server identifier of the third-party server and the third-party token to a universal identifier server.

In step 1005A, the universal identifier server sends the third-party token to the third-party server.

In step 1006A, the third-party server verifies the third-party token, acquires user information corresponding to the third-party token if the third-party token passes verification.

In step 1007A, the third-party server sends the acquired user information to the universal identifier server.

In step 1008A, the universal identifier server determines a control terminal universal identifier corresponding to the third-party server identifier and the user information.

In step 1009A, the universal identifier server sends the determined control terminal universal identifier to the instant messaging server.

In step 1010A, the instant messaging server generates a control terminal instant messaging token according to the control terminal universal identifier.

In step 1011A, the instant messaging server sends the generated control terminal instant messaging token to the universal identifier server.

In step 1012A, the universal identifier server acquires a controlled device universal identifier list corresponding to the control terminal universal identifier.

In step 1013A, the universal identifier server sends the control terminal universal identifier, the control terminal instant messaging token and the controlled device universal identifier list to the control terminal.

In step 1014A, the control terminal presents the controlled device universal identifier list, and receives a control instruction input by the user in response to receiving a controlled device selection operation of the user on a controlled device universal identifier in the presented controlled device universal identifier list.

In step 1015A, the control terminal sends a target controlled device universal identifier targeted by the controlled device selection operation, the control instruction and control terminal instant messaging token to the instant messaging server.

In step 1016A, the instant messaging server determines, according to the control terminal instant messaging token, whether to forward the control instruction to a target controlled device indicated by the target controlled device universal identifier.

In the present embodiment, the specific operations of step 1001A, step 1004A, step 1014A, and step 1015A can refer to the related description of the embodiment shown in FIG. 2, and will not be repeated here.

In the present embodiment, the specific operations of step 1005A, step 1008A, step 1009A, step 1012A and step 1013A can refer to the related description of the embodiment shown in FIG. 4, and will not be repeated here.

In the present embodiment, the specific operations of step 1010A, step 1011A, and step 1016A can refer to the related description of the embodiment shown in FIG. 5, and will not be repeated here.

The main process of the sequence among the controlled device, the universal identifier server and the instant messaging server in the present embodiment is that the controlled device sends a preset device identifier to the universal identifier server in response to detecting a start signal. The universal identifier server determines a controlled device universal identifier corresponding to the received preset device identifier, generates a universal identifier token according to the controlled device universal identifier, and sends the controlled device universal identifier to the instant messaging server. The instant messaging server generates a controlled device instant messaging token according to the received controlled device universal identifier and sends the generated controlled device instant messaging token to the universal identifier server. The universal identifier server sends the generated universal identifier token and the controlled device instant messaging token received from the instant messaging server to the controlled device. The controlled device receives the controlled device instant messaging token received from the instant messaging server and the universal identifier token generated by the universal identifier server that are sent by the universal identifier server, so that the controlled device can communicate with the instant messaging server by using the controlled device instant messaging token, and communicate with the universal identifier server by using the universal identifier token.

Referring to FIG. 10B specifically:

In step 1001B, the controlled device sends a preset device identifier to the universal identifier server in response to detecting a start signal.

In step 1002B, the universal identifier server determines a controlled device universal identifier corresponding to the received preset device identifier, and generates a universal identifier token according to the controlled device universal identifier.

In step 1003B, the universal identifier server sends the controlled device universal identifier to the instant messaging server.

In step 1004B, the instant messaging server generates a controlled device instant messaging token according to the received controlled device universal identifier.

In step 1005B, the instant messaging server sends the generated controlled device instant messaging token to the universal identifier server.

In step 1006B, the universal identifier server sends the generated universal identifier token and the controlled device instant messaging token received from the instant messaging server to the controlled device.

In step 1007B, the controlled device receives the controlled device instant messaging token and the universal identifier token sent by the universal identifier server, so that the controlled device can communicate with the instant messaging server by using the controlled device instant messaging token, and communicate with the universal identifier server by using the universal identifier token.

In the present embodiment, the specific operations of step 1001B and step 1007B can refer to the related description of the embodiment shown in FIG. 3, and will not be repeated here.

In the present embodiment, the specific operations of step 1002B, step 1003B and step 1006B can refer to the related description of the embodiment shown in FIG. 4, and will not be repeated here.

In the present embodiment, the specific operations of step 1004B and step 1005B can refer to the related description of the embodiment shown in FIG. 5, and will not be repeated here.

The intelligent device remote control system provided by the present embodiment, by adding a universal identifier server, realizes that, in a control terminal a user logs in using a third-party account, in the universal identifier server the third-party account is mapped to a unified universal identifier, and in the universal identifier server a hardware identifier of the controlled device is also mapped to the unified universal identifier; the control terminal and the controlled device realize communication through the instant messaging server both through the unified universal identifier after mapping, thus eliminating the need of registering accounts in bulk for the control terminal and the controlled device in advance, simplifying the control flow, and realizing that the control terminal can control the controlled device by using an existing third-party account.

Hereinafter, referring to FIG. 11, which shows a schematic structural diagram of a computer system adapt to implement the control terminal, the controlled device, the universal identifier server or the instant messaging server of the embodiments of the present disclosure. The terminal device, the controlled device, the universal identifier server or the instant messaging server shown in FIG. 11 are just an example, and should not impose any restrictions on functions and usage range of the embodiments of the present disclosure.

Figure 11:
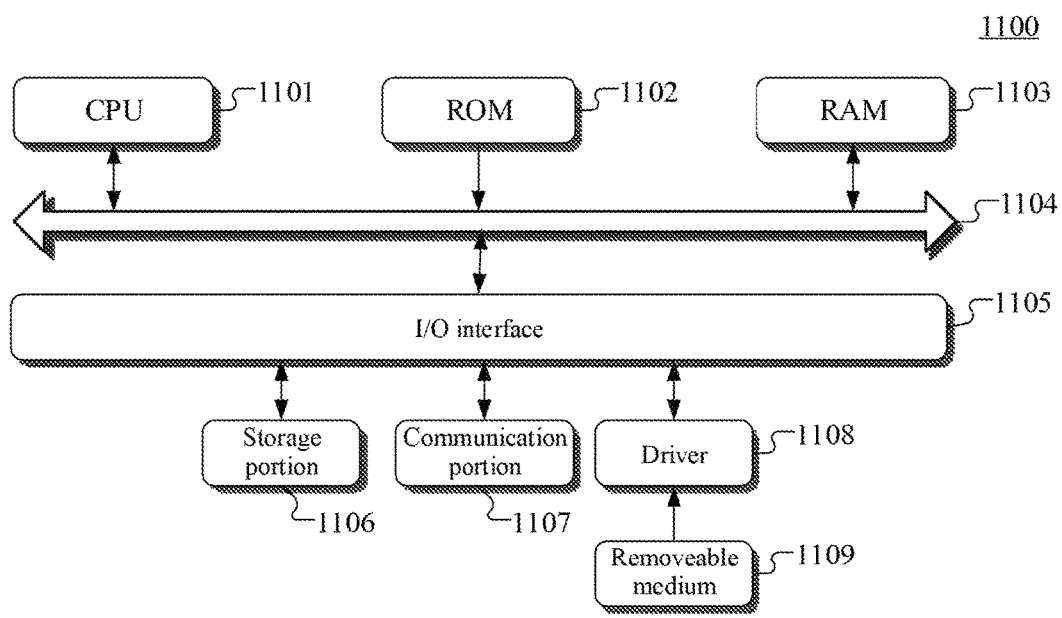
FIG. 11 is a schematic structural diagram of a computer system adapted to implement a control terminal, a controlled device, a universal identifier server or an instant messaging server of the embodiments of the present disclosure.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion X08. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: a storage portion 1106 including a hard disk and the like; and a communication portion 1107 comprising a network interface card, such as a LAN card and a modem. The communication portion 1107 performs communication processes via a network, such as the Internet. A driver 1107 is also connected to the I/O interface 1105 as required. A removable medium 1109, such as a magnetic disk, an optical disk, a magneto-optical disk, and a semiconductor memory, may be installed on the driver 1108, to facilitate the retrieval of a computer program from the removable medium 1109, and the installation thereof on the storage portion 1106 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 1107, and/or may be installed from the removable media 1109. The computer program, when executed by the central processing unit (CPU) 1101, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a first sending unit, a second sending unit, a first receiving unit, a second receiving unit and a third sending unit. For another example, described as: a processor, comprising a fourth sending unit and a third receiving unit. For another example, may be described as: a processor, comprising a fifth sending unit, a second determining unit, a sixth sending unit, a fourth receiving unit, a first acquiring unit, a seventh sending unit, a third determining unit, a first generating unit, a eighth sending unit and a ninth sending unit. For another example, may be described as: a second generating unit, a tenth sending unit, a third generating unit, an eleventh sending unit and a fourth determining unit. Where the names of these units or modules do not in some cases constitute a limitation to such units or modules themselves. For example, the first sending unit may also be described as "a unit for sending an account information.

As another aspect, the present disclosure further provides a computer-readable medium. The computer-readable medium may be the computer medium included in the apparatus in the above described embodiments, or a stand-alone computer-readable medium not assembled into the apparatus. The computer-readable medium stores one or more programs, wherein when the one or more programs are executed by the apparatus, the apparatus is caused to: in response to receiving account information of a target third-party account type input by a user, send the account information to a third-party server corresponding to the target third-party account type for the third-party server to generate a third-party token corresponding to the account information; send a third-party server identifier and the third-party token of the third-party server to a universal identifier server in response to receiving the third-party token sent by the third-party server, for the universal identifier server to send the third-party token to the third-party server, receive user information corresponding to the third-party token from the third-party server, determine a control terminal universal identifier corresponding to the third-party server identifier and the user information, send the control terminal universal identifier to an instant messaging server, receive a control terminal instant messaging token generated by the instant messaging server according to the control terminal universal identifier from the instant messaging server, and acquire a controlled device universal identifier list corresponding to the control terminal universal identifier; receive the control terminal universal identifier, the control terminal instant messaging token and the controlled device universal identifier list, and present the controlled device universal identifier list that are sent by the universal identifier server; receive a control instruction input by the user in response to receiving a controlled device selection operation of the user on a controlled device universal identifier in the presented controlled device universal identifier list; and send a target controlled device universal identifier targeted by the controlled device selection operation, the control instruction and the control terminal instant messaging token to the instant messaging server, for the instant messaging server to determine whether to forward the control instruction to a target controlled device indicated by the target controlled device universal identifier according to the control terminal instant messaging token.

As another one more aspect, the present disclosure further provides a computer-readable medium. The computer-readable medium may be the computer medium included in the apparatus in the above described embodiments, or a standalone computer-readable medium not assembled into the apparatus. The computer-readable medium stores one or more programs, wherein when the one or more programs are executed by the apparatus, the apparatus is caused to: send a preset device identifier to a universal identifier server in response to detecting a start signal, for the universal identifier server to determine a controlled device universal identifier corresponding to the preset device identifier, generate a universal identifier token according to the controlled device universal identifier, send the controlled device universal identifier to an instant messaging server, and receive, from the instant messaging server, a controlled device instant messaging token generated according to the controlled device universal identifier by the instant messaging server; and receive the controlled device instant messaging token and the universal identifier token sent by the universal identifier server to communicate with the instant messaging server using the controlled device instant messaging token and communicate with the universal identifier server using the universal identifier token.

As another one more aspect, the present disclosure further provides a computer-readable medium. The computer-readable medium may be the computer medium included in the apparatus in the above described embodiments, or a standalone computer-readable medium not assembled into the apparatus. The computer-readable medium stores one or more programs, wherein when the one or more programs are executed by the apparatus, the apparatus is caused to: send a third-party token to a third-party server indicated by a third-party server identifier in response to receiving the third-party server identifier and the third-party token sent by a control terminal, for the third-party server to determine user information corresponding to a received third-party token according to the received third-party token; in response to receiving the user information corresponding to the third-party token sent by the third-party server, determine a control terminal universal identifier corresponding to the third-party server identifier and the user information; send the control terminal universal identifier to an instant messaging server for the instant messaging server to generate a control terminal instant messaging token according to the control terminal universal identifier; receive the control terminal instant messaging token sent by the instant messaging server; acquire a controlled device universal identifier list corresponding to the control terminal universal identifier; send the control terminal universal identifier, the control terminal instant messaging token and the controlled device universal identifier list to the control terminal; determine a controlled device universal identifier corresponding to the device identifier in response to receiving the device identifier sent by the controlled device; generate a universal identifier token according to the controlled device universal identifier; send the controlled device universal identifier to an instant messaging server for the instant messaging server to generate a controlled device instant messaging token according to the controlled device universal identifier; and send the controlled device instant messaging token and the universal identifier token to the controlled device in response to receiving the controlled device instant messaging token sent by the instant messaging server, for the controlled device to communicate with the instant messaging server by using the controlled device instant messaging token, and communicate with the universal identifier server by using the universal identifier token.

As another one more aspect, the present disclosure further provides a computer-readable medium. The computer-readable medium may be the computer medium included in the apparatus in the above described embodiments, or a standalone computer-readable medium not assembled into the apparatus. The computer-readable medium stores one or more programs, wherein when the one or more programs are executed by the apparatus, the apparatus is caused to: in response to receiving a control terminal universal identifier sent by a universal identifier server, generate a control terminal instant messaging token according to the control terminal universal identifier; send the generated control terminal instant messaging token to the universal identifier server; generate a controlled device instant messaging token according to the controlled device universal identifier in response to receiving the controlled device universal identifier sent by the universal identifier server; send the generated controlled device instant messaging token to the universal identifier server; and in response to receiving a target controlled device universal identifier, a control instruction and the control terminal instant messaging token sent by the control terminal, determine, according to the received control terminal instant messaging token, whether to forward the control instruction to a target controlled device indicated by the target controlled device universal identifier.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for remote control of an intelligent device, applied to a control terminal, the method comprising:
  sending account information of a target third-party account type input by a user to a third-party server corresponding to the target third-party account type, for the third-party server to generate a third-party token corresponding to the account information, in response to receiving the account information;
  sending a third-party server identifier of the third-party server and the third-party token to a universal identifier server, in response to receiving the third-party token sent by the third-party server, for the universal identifier server to send the third-party token to the third-party server, receive user information corresponding to the third-party token from the third-party server, determine a control terminal universal identifier corresponding to the third-party server identifier and the user information, send the control terminal universal identifier to an instant messaging server, receive a control terminal instant messaging token generated by the instant messaging server according to the control terminal universal identifier from the instant messaging server, and acquire a controlled device universal identifier list corresponding to the control terminal universal identifier;

receiving the control terminal universal identifier, the control terminal instant messaging token and the controlled device universal identifier list sent by the universal identifier server, and presenting the controlled device universal identifier list;

receiving a control instruction input by the user, in response to receiving a controlled device selection operation of the user on a controlled device universal identifier in the presented controlled device universal identifier list; and sending a target controlled device universal identifier targeted by the controlled device selection operation, the control instruction and the control terminal instant messaging token to the instant messaging server, for the instant messaging server to determine whether to forward the control instruction to a target controlled device indicated by the target controlled device universal identifier according to the control terminal instant messaging token.

2. The method according to claim 1, wherein, before the sending the account information of a target third-party account type input by a user to the third-party server corresponding to the target third-party account type in response to receiving the account information, the method further comprises:

presenting information of at least one third-party account type; and defining the third-party account type indicated by the information of the third-party account type targeted by an account type selection operation as the target third-party account type, in response to receiving the account type selection operation of the user on the information of the third-party account type in the presented information of the at least one third-party account type.

3. The method according to claim 2, wherein the generating a third-party token corresponding to the account information by the third-party server comprises:

generating the third-party token corresponding to the account information by the third-party server in response to the account information being verified.

4. A method for remote control of an intelligent device, applied to a controlled device, the method comprising:

sending a preset device identifier to a universal identifier server in response to detecting a start signal, for the universal identifier server to determine a controlled device universal identifier corresponding to the preset device identifier, generate a universal identifier token according to the controlled device universal identifier, send the controlled device universal identifier to an instant messaging server, and receive, from the instant messaging server, a controlled device instant messaging token generated according to the controlled device universal identifier by the instant messaging server; and receiving the controlled device instant messaging token and the universal identifier token sent by the universal identifier server to communicate with the instant messaging server by using the controlled device instant messaging token and communicate with the universal identifier server by using the universal identifier token.

5. A method for remote control of an intelligent device, applied to a universal identifier server, the method comprising:

sending a third-party token to a third-party server indicated by a third-party server identifier, in response to receiving the third-party server identifier and the third-party token sent by a control terminal, for the third-party server to determine user information corresponding to the received third-party token according to the received third-party token;

determining a control terminal universal identifier corresponding to the third-party server identifier and the user information, in response to receiving the user information corresponding to the third-party token sent by the third-party server;

sending the control terminal universal identifier to an instant messaging server, for the instant messaging server to generate a control terminal instant messaging token according to the control terminal universal identifier;

receiving the control terminal instant messaging token sent by the instant messaging server;

acquiring a controlled device universal identifier list corresponding to the control terminal universal identifier;

sending the control terminal universal identifier, the control terminal instant messaging token and the controlled device universal identifier list to the control terminal;

determining a controlled device universal identifier corresponding to a device identifier, in response to receiving the device identifier sent by a controlled device;

generating a universal identifier token according to the controlled device universal identifier;

sending the controlled device universal identifier to the instant messaging server, for the instant messaging server to generate a controlled device instant messaging token according to the controlled device universal identifier; and sending the controlled device instant messaging token and the universal identifier token to the controlled device, in response to receiving the controlled device instant messaging token sent by the instant messaging server, for the controlled device to communicate with the instant messaging server by using the controlled device instant messaging token and communicate with the universal identifier server by using the universal identifier token.

6. The method according to claim 5, wherein the determining the control terminal universal identifier corresponding to the third-party server identifier and the user information comprises:

querying a control terminal universal identifier corresponding to the third-party server identifier and the user information in a first preset database, wherein the first preset database correspondingly stores the third-party server identifier, the user information and the control terminal universal identifier;

defining the found control terminal universal identifier as the control terminal universal identifier corresponding to the third-party server identifier and the user information, in response to finding the control terminal universal identifier corresponding to the third-party server identifier and the user information; and generating the control terminal universal identifier corresponding to the third-party server identifier and the user information according to a preset universal identifier format, and correspondingly storing the generated control terminal universal identifier, the third-party server identifier and the user information into the first preset database, in response to not finding the control terminal universal identifier corresponding to the third-party server identifier and the user information.

7. The method according to claim 6, wherein the determining the controlled device universal identifier corresponding to the device identifier comprises:
querying the controlled device universal identifier corresponding to the device identifier in a second preset database;
defining the found controlled device universal identifier as the controlled device universal identifier corresponding to the device identifier, in response to finding the controlled device universal identifier corresponding to the device identifier; and
generating the controlled device universal identifier corresponding to the device identifier according to the preset universal identifier format, and correspondingly storing the generated controlled device universal identifier and the device identifier into the second preset database, in response to not finding the controlled device universal identifier corresponding to the device identifier.

8. The method according to claim 7, wherein the control terminal universal identifier in the first preset database and the controlled device universal identifier in the second preset database are different from each other.

9. A method for control of an intelligent device, applied to an instant messaging server, the method comprising:
generating a control terminal instant messaging token according to a control terminal universal identifier, in response to receiving the control terminal universal identifier sent by a universal identifier server, wherein the universal identifier server generated the control terminal universal identifier in response to receiving user information corresponding to a third-party token sent by a third-party server, wherein the universal identifier server is configured to send the third-party token to the third-party server, receive the user information corresponding to the third-party token from the third-party server, and generate the control terminal universal identifier corresponding to the third-party server identifier and the user information;
sending the generated control terminal instant messaging token to the universal identifier server;
generating a controlled device instant messaging token according to a controlled device universal identifier, in response to receiving the controlled device universal identifier sent by the universal identifier server;
sending the generated controlled device instant messaging token to the universal identifier server; and
determining, according to the received control terminal instant messaging token, whether to forward a control instruction to a target controlled device indicated by a target controlled device universal identifier, in response to receiving the target controlled device universal identifier, the control instruction and the control terminal instant messaging token sent by a control terminal.

10. An apparatus for remote control of an intelligent device applied to a control terminal, the apparatus comprising:
at least one processor; and
a memory storing instructions, the instructions when executed by the at least one processor, cause the at least one processor to perform the method according to claim 1.

11. The apparatus according to claim 10, wherein the operations further comprise:
presenting information of at least one third-party account type; and
defining the third-party account type indicated by the information of the third-party account type targeted by an account type selection operation as the target third-party account type, in response to receiving the account type selection operation of the user on the information of the third-party account type in the presented information of the at least one third-party account type.

12. The apparatus according to claim 11, wherein the generating a third-party token corresponding to the account information by the third-party server comprises:
generating the third-party token corresponding to the account information by the third-party server in response to the account information being verified.

13. An apparatus for remote control of an intelligent device applied to a controlled device, the apparatus comprising:
at least one processor; and
a memory storing instructions, the instructions when executed by the at least one processor, cause the at least one processor to perform the method according to claim 4.

14. An apparatus for remote control of an intelligent device, applied to a universal identifier server, the apparatus comprising:
at least one processor; and
a memory storing instructions, the instructions when executed by the at least one processor, cause the at least one processor to perform the method according to claim 5.

15. The apparatus according to claim 14, wherein the determining the control terminal universal identifier corresponding to the third-party server identifier and the user information comprises:
querying a control terminal universal identifier corresponding to the third-party server identifier and the user information in a first preset database, wherein the first preset database correspondingly stores the third-party server identifier, the user information and the control terminal universal identifier;
defining the found control terminal universal identifier as the control terminal universal identifier corresponding to the third-party server identifier and the user information, in response to finding the control terminal universal identifier corresponding to the third-party server identifier and the user information; and
generating the control terminal universal identifier corresponding to the third-party server identifier and the user information according to a preset universal identifier format, and correspondingly storing the generated control terminal universal identifier, the third-party server identifier and the user information into the first preset database, in response to not finding the control terminal universal identifier corresponding to the third-party server identifier and the user information.

16. The apparatus according to claim 15, wherein determining the controlled device universal identifier corresponding to the device identifier comprises:
querying the controlled device universal identifier corresponding to the device identifier in a second preset database;
defining the found controlled device universal identifier as the controlled device universal identifier corresponding to the device identifier, in response to finding the controlled device universal identifier corresponding to the device identifier; and generating the controlled device universal identifier corresponding to the device identifier according to the preset universal identifier format, and correspondingly storing the generated controlled device universal identifier and the device identifier into the second preset database, in response to not finding the controlled device universal identifier corresponding to the device identifier.

17. The apparatus according to claim 16, wherein the control terminal universal identifier in the first preset database and the controlled device universal identifier in the second preset database are different from each other.

18. An apparatus for control of an intelligent device, applied to an instant messaging server, the apparatus comprising:
    at least one processor; and
    a memory storing instructions, the instructions when executed by the at least one processor, cause the at least one processor to perform the method according to claim 9.

19. A non-transitory computer readable storage medium, on which computer programs are stored, wherein the computer programs, when executed by a processor, cause the processor to perform the method according to claim 1.

20. A non-transitory computer readable storage medium, on which computer programs are stored, wherein the computer programs, when executed by a processor, cause the processor to perform the method according to claim 4.

21. A non-transitory computer readable storage medium, on which computer programs are stored, wherein the computer programs, when the programs are executed by a processor, cause the processor to perform the method according to claim 5.

22. A non-transitory computer readable storage medium, on which computer programs are stored, wherein the computer programs, when the programs are executed by a processor, cause the processor to perform the method according to claim 5.

* * * * *